United States Patent
Iida et al.

[15] 3,692,435
[45] Sept. 19, 1972

[54] HERMETICALLY SEALED ELECTRIC COMPRESSOR

[72] Inventors: Toshikatsu Iida, Shizuoka; Bunzi Sato, Kawasaki, both of Japan

[73] Assignee: Tokyo Shibaura Electric Co., Ltd., Kawasaki-shi, Japan

[22] Filed: Feb. 2, 1971

[21] Appl. No.: 111,982

[30] Foreign Application Priority Data

March 25, 1970 Japan ..................... 45/28855

[52] U.S. Cl. ................. 417/372, 417/415, 417/902, 184/6.18
[51] Int. Cl. .... F04b 17/00, F04b 35/00, F04b 39/02, F01m 9/00
[58] Field of Search ............. 417/415, 372, 410, 902; 184/6.18

[56] References Cited

UNITED STATES PATENTS 2,996,240  8/1961  Stocklein et al. ...... 417/415 X
3,049,285  8/1962  Doeg ....................... 417/372

FOREIGN PATENTS OR APPLICATIONS 609,362  9/1960  Italy ......................... 417/372

*Primary Examiner*—Robert M. Walker
*Attorney*—Flynn & Frishauf

[57] ABSTRACT

A hermetically sealed electric compressor comprising a casing, a frame received therein so as rotatably to support a revolving shaft and suspending an electric motor and a compressing unit, wherein a lubricant passage provided in the revolving shaft includes a receptacle for trapping solid foreign matter entrained with a lubricant and gas passage for causing said receptacle to communicate with the interior of the casing, thereby eliminating in the receptacle foreign matter and refrigerant from the lubricant supplied to the rotating and sliding parts from its reservoir through the lubricant passage.

5 Claims, 5 Drawing Figures

3,692,435

HERMETICALLY SEALED ELECTRIC COMPRESSOR

The present invention relates to a hermetically sealed electric compressor equipped with means for removing foreign matter entrained with a lubricant.

In general, a compressor used in, for example, a room cooler is demanded to operate silently for long hours. However, it sometimes happens that foreign matter contained in the lubricant is carried along to the interstice between the bearing of an electric motor and the revolving shaft or between the other rotating or sliding parts, resulting in the occurrence of noises or the shaking of the apparatus itself and possibly its failure.

To prevent such difficulties, there have heretofore been proposed a variety of devices for groove filtering or eliminating foreign matter. However, any of said devices is of complicated constructions, presents difficulties in maintenance and checking, and moreover requires high manufacturing cost.

Particularly with a compressor of the type wherein there is provided a lubricant passage in the revolving shaft and the lubricant moves upward through the lubricant passage by a centrifugal force generated by the rotation of the revolving shaft to be supplied to the required parts, there is either formed a depression in the inner wall of the lubricant passage or an annular 1groove or grooves about the outer wall of the revolving shaft for communication with said lubricant passage, thereby trapping solid foreign matter such as fine iron particles entrained with the lubricant so as to prevent it from intruding into those parts which should be lubricated.

With the above mentioned methods, however, it is necessary to enlarge said depression or annular groove or raise its height in order to hold relating large amounts of foreign matter. This unavoidably weakens the mechanical strength of the revolving shaft, making it extremely difficult to work up a depression.

Further, the lubricant often contains a gaseous refrigerant. Heretofore, however, there has not been developed any means for effectively removing such foreign matter.

A compressor according to the present invention has a receptacle and gas passage provided in a lubricant passage bored through a revolving shaft.

An object of the present invention is to provide a compressor wherein, while the revolving shaft is rotated, any foreign matter entrained with a lubricant is trapped in the receptacle provided in the lubricant passage to prevent said foreign matter from intruding into rotating and sliding parts.

Another object of the invention is to provide a compressor capable of eliminating during the rotation of the revolving shaft any gaseous refrigerant from a lubricant travelling through the lubricant passage.

Still another object of the invention is to provide a compressor of simple construction and effective to trap foreign matter wherein there is formed in the revolving shaft a receptacle capable of being provided at low cost without reducing the mechanical strength of said shaft.

The present invention can be more fully understood from the following detailed description when taken in connection with reference to the accompanying drawings, in which.

Figure 1:
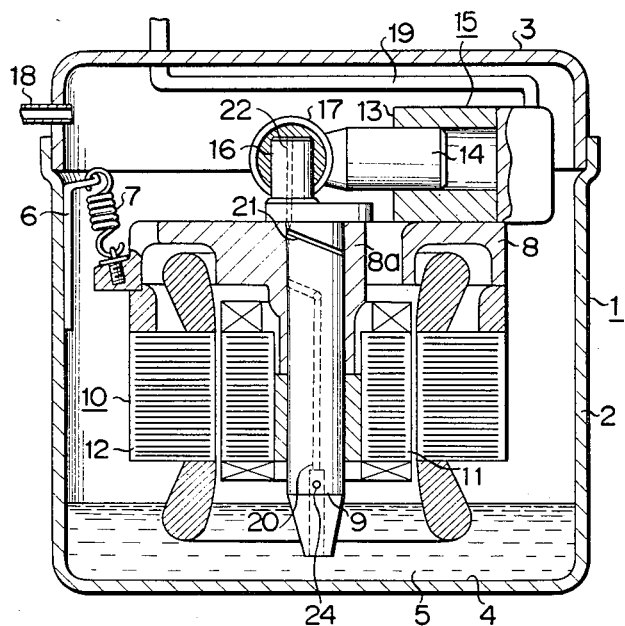
FIG. 1 is a longitudinal sectional view of a compressor according to an embodiment of the present invention.

Referring to FIG. 1, numeral 1 denotes a casing consisting of an upper shell 3 open at the bottom and a lower shell 2 open at the top, said shells tightly abutting against each other for a hermetic seal. The inner bottom wall of the lower shell 2 defines a reservoir 4 for storing a lubricant 5. The upper inner wall of the casing is fitted at several places with spring holders 6 to be engaged with the upper portion of springs 7, which cooperate to suspend a frame 8 substantially at the center of the interior of the casing 1. At the center of the frame 8 is integrally formed a journal box 8a into which is inserted the upper end of a revolving shaft 9, the lower end of which is immersed in a lubricant 5.

Numeral 10 represents an electric motor consisting of a rotor 11 and a stator 12 coaxially arranged with each other. The rotor 11 is substantially integrally fitted to the revolving shaft 9 and the stator 12 is fixed to the underside of the frame 8. To the upper surface of the frame 8 is fixed one side wall of a cylinder 13, into which there is fitted a reciprocating piston 14, said cylinder 13 and piston 14 constituting a compressing unit 15.

Numeral 16 denotes a piston driving shaft eccentrically fitted to the revolving shaft 9 so as to rotate about it with its rotation, thereby reciprocating the piston 14 by means of scotch yoke 17.

To one side of the casing 1 is connected an inlet tubing 18 for a refrigerant, and to the outlet port of the cylinder 13 is connected an outlet tubing 19, which extends through the casing 1 to the outside.

Through the revolving shaft 9 is bored a lubricant passage 20 in the axial direction. The lower end of said passage 20 poens to the lower end of the revolving shaft 9 and the upper end of said passage 20 communicates with the lower end of a helical groove or grooves 21 formed in the upper outer wall of the revolving shaft 9 which contacts the journal box 8a. The upper part of the helical groove 21 communicates with an outlet 22 for the lubricant 5.

Figure 2:
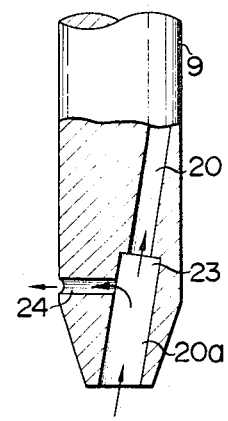
FIG. 2 is a sectional view of a receptacle and gas passage according to said embodiment.
Figure 3:
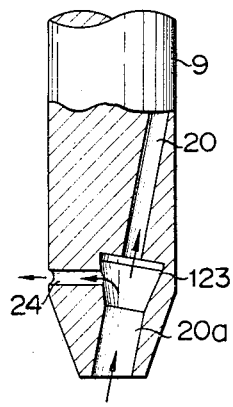
FIG. 3 is a sectional view of a receptacle and gas passage according to another embodiment.
Figure 4:
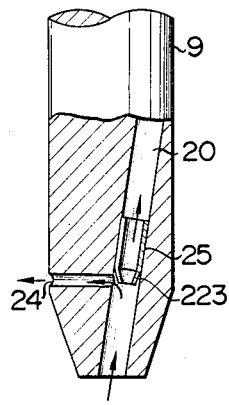
FIG. 4 is a sectional view of a receptacle and gas passage according to still another embodiment.

The lubricant passage 20 is inclined, as shown in FIGS. 2 to 4, with respect to the axis of the revolving shaft 9, with the bottom opening of said passage 20 disposed at the center of the bottom end face of said shaft 9.

Referring to FIG. 2, the lubricant passage 20 is additionally fitted at the lower end with another lubricant passage 20a having a larger diameter than the former. It is preferred that the upper surface of said extra passage 20a be located above the level of the lubricant 5. The stepped portion of the joint of both lubricant passages 20 and 20a constitutes a foreign matter receptacle 23.

A gas passage 24 allows the receptacle 23 to communicate with a void space in the casing 1. Said gas passage is bored through the revolving shaft 9 substantially parallel with the base plane of the thick-walled portion of said revolving shaft 9 defined between its outer wall and the inner wall of the lubricant passage 20. It is preferred that the diameter of said gas passage 24 be smaller than that of the lubricant passage 20.

There will now be described the operation of a compressor according to the embodiment of FIGS. 1 and 2 when the electric motor 10 drives the revolving shaft 9, the piston 14 reciprocates through the cylinder 13 by means of the piston driving shaft 16 and scotch yoke 17. As a result, a gaseous refrigerant introduced into the casing 1 from the inlet tubing 18 through a check valve (not shown) is sucked into the cylinder 13 for compression and expelled into the outlet tubing 19 through another check valve (not shown).

As described above, the lubricant passage 20 is inclined to the axis of the revolving shaft 9, so that the lubricant passage 20 is progressively removed from one outer wall of the revolving shaft 9 from the bottom to the top. When, therefore, the revolving shaft 9 rotates, the higher the position assumed by the lubricant in the lubricant passage 20, the greater the centrifugal force applied to the lubricant. According, the lubricant 5 goes up through said passage 20 to the helical groove 21 ro wet the revolving shaft 9 and the journal box 8a and is expelled to the outside through the outlet 22. Foreign matter entrained with the lubricant also moves up through the large diameter lubricant passage 20a. In this case, heavier solid foreign matter than the liquid lubricant, for example, fine iron particles is subject to so strong a centrifugal force that it is forced toward the outer circle of the shaft rotation and eventually trapped in the receptacle 23. On the other hand, lighter foreign matter than the liquid lubricant, a gaseous refrigerant, is collected on the inside of the shaft rotation and discharged into a void space in the casing 1 through the gas passage 24.

Thus, foreign matter, regardless of the kind, is eliminated from the lubricant by means of the receptacle 23 and gas passage 24, enabling a clear liquid lubricant to be always supplied to the rotating and sliding parts. When the revolving shaft 9 ceases to rotate, foreign matter held in the receptacle 23 settles down with its own weight to the bottom of the reservoir 4. Since, however, the lower end of the revolving shaft 9 is immersed in the lubricant of the reservoir 4 only to a small depth and does not disturb said lubricant, the deposit of foreign matter is prevented from floating up again.

Figure 5:
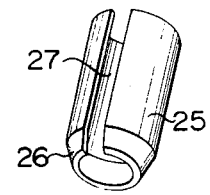
FIG. 5 is a perspective view of a sleeve used in FIG. 4.

FIG. 3 illustrates another embodiment of the invention wherein there is formed an inverted conical receptacle 123 at the upper end of the large diameter lubricant passage 20a of FIG. 2 so as to trap large amounts of solid foreign matter. FIG. 4 represents still another embodiment wherein there is inserted a hollow cylindrical sleeve 25 into the lubricant passage 20 instead of fitting the large diameter lubricant passage 20a of FIG. 2 to the lower end of the lubricant passage 20. Said sleeve 25 assumes, as shown in FIG. 5, an inverted conical form at the lower end 26. Thus solid foreign matter is collected in a receptacle defined between the inner wall of the lubricant passage 20 and the outer wall of said conical lower end 26 of the sleeve 25. The sleeve 25 may be prepared from elastic metal material rolled into the cylindrical form and provided with a slit 27 extending along the entire length of the sleeve 25 so as to facilitate its insertion into the lubricant passage 20.

Throughout FIGS. 1 to 4, the gas passage 23 may be omitted, if there is no need to remove a gaseous refrigerant from the lubricant 5.

What we claim is:

1. A hermetically sealed electric compressor comprising:

a casing;

a frame received in said casing;

a revolving shaft inserted into the center of the frame;

an electric motor comprised of a rotor engaging the revolving shaft and a stator fixed to the underside of the frame and suspended from said frame so as to rotate the driving shaft;

a compressing unit mounted on the upper surface of the frame and actuated by the rotation of the revolving shaft;

a lubricant passage bored through the revolving shaft in an inclined relationship to the axis of said shaft with the bottom opening of the lubricant passage disposed at the center of the bottom end face of said shaft; and a hollow cylindrical sleeve having a conical lower end and being inserted in said lubricant passage at an intermediate part of its inner wall to form a receptacle constituted by a space defined between the inner wall of the lubricant passage and the outer wall of the conical lower end of the hollow cylindrical sleeve inserted into said passage.

2. The compressor according to claim 4 wherein the revolving shaft includes a gas passage bored substantially crosswise therethrough so as to cause the receptacle to communicate with a void space in the casing.

3. A hermetically sealed electric compressor comprising:

a casing;

a frame received in said casing;

a revolving shaft inserted into the center of the frame;

an electric motor including a rotor coupled to said revolving shaft and a stator extending downward from said frame;

a compressing unit mounted on the upper surface of the frame so as to be actuated by the rotation of said revolving shaft;

a lubricant passage bored through said receiving shaft in an inclined relation to the axis thereof and open to the outside of the revolving shaft with a lubricant passage opening concentric with the lower end of the revolving shaft; and a receptacle formed in an expanded intermediate portion of said lubricant passage, said receptacle comprising an expanded inverted conically shaped passage portion for trapping foreign matter entrained with a lubricant;

the diameter of the lubricant passage at the base of the said conically shaped passage portion being larger than that of the lubricant passage above said conically shaped passage portion.

4. The compressor according to claim 3 wherein the diameter of the base of the conically shaped passage portion is substantially the same as that of the lower lubricant passage portion adjacent thereto.

5. The compressor according to claim 3 wherein the revolving shaft includes a gas passage bored substantially crosswise therethrough so as to cause the receptacle to communicate with a void space in the casing.

* * * * *